United States Patent [19]

Siemens et al.

[11] 4,371,103

[45] Feb. 1, 1983

[54] PROCESS AND APPARATUS FOR BREAKING OFF MARGINAL EDGE PORTIONS FROM A GLASS PANE

[75] Inventors: Walter Siemens; Günther Ulrich, both of Herzogenrath; Karl R. Bartusel, Stolberg, all of Fed. Rep. of Germany

[73] Assignee: Saint-Gobain Vitrage, Paris, France

[21] Appl. No.: 206,253

[22] Filed: Nov. 12, 1980

[30] Foreign Application Priority Data

Nov. 13, 1979 [DE] Fed. Rep. of Germany ....... 2945682

[51] Int. Cl.³ ............................................. C03B 33/04
[52] U.S. Cl. .......................................... 225/1; 225/2; 225/96.5; 225/97
[58] Field of Search ................... 225/2, 96.5, 97, 103, 225/93

[56] References Cited

U.S. PATENT DOCUMENTS 3,532,259 10/1970 Augustin et al.
3,770,173 11/1973 Carothers et al.
3,913,812 10/1975 Augustin et al.
4,106,683 8/1978 Gulish, Jr.
4,109,841 8/1978 De Torre ............................ 225/96.5
4,151,940 5/1979 Nuding et al.
4,285,451 8/1981 Ferraino ......................... 225/96.5 X

FOREIGN PATENT DOCUMENTS 2724238 12/1977 Fed. Rep. of Germany .
2826694 2/1979 Fed. Rep. of Germany .
2179708 11/1973 France .
2228730 12/1974 France .
2379490 9/1978 France .

Primary Examiner—Frank T. Yost
Attorney, Agent, or Firm—Pennie & Edmonds

[57] ABSTRACT

The invention relates to a process and apparatus for breaking off the marginal strip of a glass blank scored according to a predetermined contour. The glass blank, resting with its entire surface on an elastically resilient support, is put under tensile stresses in the area of the marginal strip by lowerable pressure tools.

16 Claims, 7 Drawing Figures

PROCESS AND APPARATUS FOR BREAKING OFF MARGINAL EDGE PORTIONS FROM A GLASS PANE

TECHNICAL FIELD

The invention relates to a new and improved process for scoring and then breaking off a marginal strip of a glass blank laterally outward of the score in the formation of a glass pane and to the apparatus for carrying out the process.

BACKGROUND ART

Processes and apparatus for breaking off the marginal strip of a glass blank laterally outward of a score defining the contour of a glass pane are known in the prior art. These processes, as the present process and the apparatus to be described, have particular utility in the fabrication of glass panes suitable for use in automobiles.

German Offenlegungsschrift Nos. 27 24 238 and 28 26 694 as well as U.S. Pat. No. 3,913,812 describe processes which generally relate to the application of tensile stress within the area of the score defining the contour of the glass pane for purposes of breaking off the strip laterally outward of the score. Typically, the glass blank whose marginal edge portions are broken away whereby the glass pane remains is supported by a rigid tool in the area below the score and pressure is applied by pressure tools lowered from above and acting on both sides of the score.

One problem and disadvantage with regard to apparatus of this type is that the supporting tool required in use must be adapted to the contour of the glass pane from which the lateral edge portions are broken. What this means is that for every change in contour of a glass pane it is required that the apparatus be converted and aligned to accommodate that change. Thus, individual supporting tools for use in the fabrication of a glass pane of particular contour must be located to the apparatus for accomplishing the end result with consequent expenditure, which may be considerable, in the required change as well as loss through idle time during the changeover period.

The prior art also includes forms of apparatus used in the fabrication of a glass pane which do not require supporting tools having a contour which generally duplicates the contour of the glass pane to be fabricated. A typical apparatus of this type is disclosed in U.S. Pat. No. 3,532,259. Particularly, the glass blank is supported on an elastically resilient support which may be in the form of a belt comprising the belt of a conveyor. The belt rests on a level metal plate and tensile stresses are developed by means of a plurality of pressure tools which are lowered toward the glass blank from an elevated position. The pressure tools which contact the surface of the glass blank may have a diameter of approximately 30 mm. The pressure tools are disposed in a manner so that they are capable of acting upon the glass blank along the score when lowered from the elevated position. According to this process as disclosed in the aforementioned patent, the surface of the glass blank supported by the elastically resilient support undergoes tensile stress through action of the pressure tools and through this action the score defining the contour of the glass pane undergoes compressive stress. The bending moment, accordingly, is opposite, it may be considered to have an opposite sign from the bending moment which the glass blank undergoes in the first described process and apparatus. It has been found that a negative bending moment, particularly if the thickness of the glass blank is in excess of 3 mm, is not satisfactory in the fabrication of a glass pane. To this end, it has been found that it is difficult to cause the marginal edge portions laterally outward of the score to break away from the glass pane by a neat, true break.

DISCLOSURE OF INVENTION

The present invention is in a process and apparatus which overcomes the previously-described disadvantages. Particularly, the glass blank which is to be processed rests with its entire surface on a level elastic support without the need for rigid supporting tools dependent on the contour of the glass pane to be fabricated. This process provides that a neat breaking edge is achieved without conchoidalizations. Further, the process is applicable for glass blanks of variable thickness. Moreover, in view of the capability of change in the alignment of a plurality of pressure pins relative to a support, the process is variable to a high degree.

The invention is distinguished by the fact that resiliently mounted pressure pins at a slight distance apart are lowered individually onto the surface of the glass blank in such a way that a higher surface pressure is applied to the marginal strip outside of the score by a greater number of pressure pins than is applied to the glass pane inside of the score, and at the same time the elastic support is deformed more strongly outside of the score than inside of the score. Thus, the surface provided with the score is placed under tensile stresses causing the break along the score cutting line.

As a result of the process of the invention, the required bending moment is produced in the case of a whole surface support of the glass blank on an elastic support by a pressure that per unit area is not equal. To this end, the marginal strip of the glass blank is more strongly pressed into the elastic support than is the portion on the other side of the score. Thus, a bending moment may be achieved in the area of the score in the case of a completely homogeneous support, that is, without any additional support, making possible a considerably easier breaking off of the marginal strip and at the same time a better quality of the breaking edge.

Apart from the good quality of the breaking edge, other essential advantages will result from a practice of the process which make it particularly suitable for its application in an automated production line. To this end, since a plurality of pressure pins is always disposed in succession in the radial direction, that is, in the direction transverse to the score, which pressure pins are spaced by a distance less than the width of the marginal strip to be broken off, it is possible to break off the marginal strip of a glass pane within certain limits and with mutually deviating shapes at an unchanged position of the pressure pins. This is the case so long as there is the assurance that the marginal strip is grasped by the pressure pins.

It is not absolutely necessary for the glass blank always to assume the same position. To this end, slight shifts within the breaking station are of no consequence. Further, the change-over time of the apparatus is extremely short in the case of this process, because no changes whatever need to be made below the glass blank and relocation of the pressure pins is easily obtained. Thus, the apparatus is flexible in its range of application. Finally, it turned out, that with the apparatus of the invention, it is also possible to break off glass pane shapes automatically, even though they may have projecting parts.

BEST MODE FOR CARRYING OUT THE INVENTION

Figure 1:
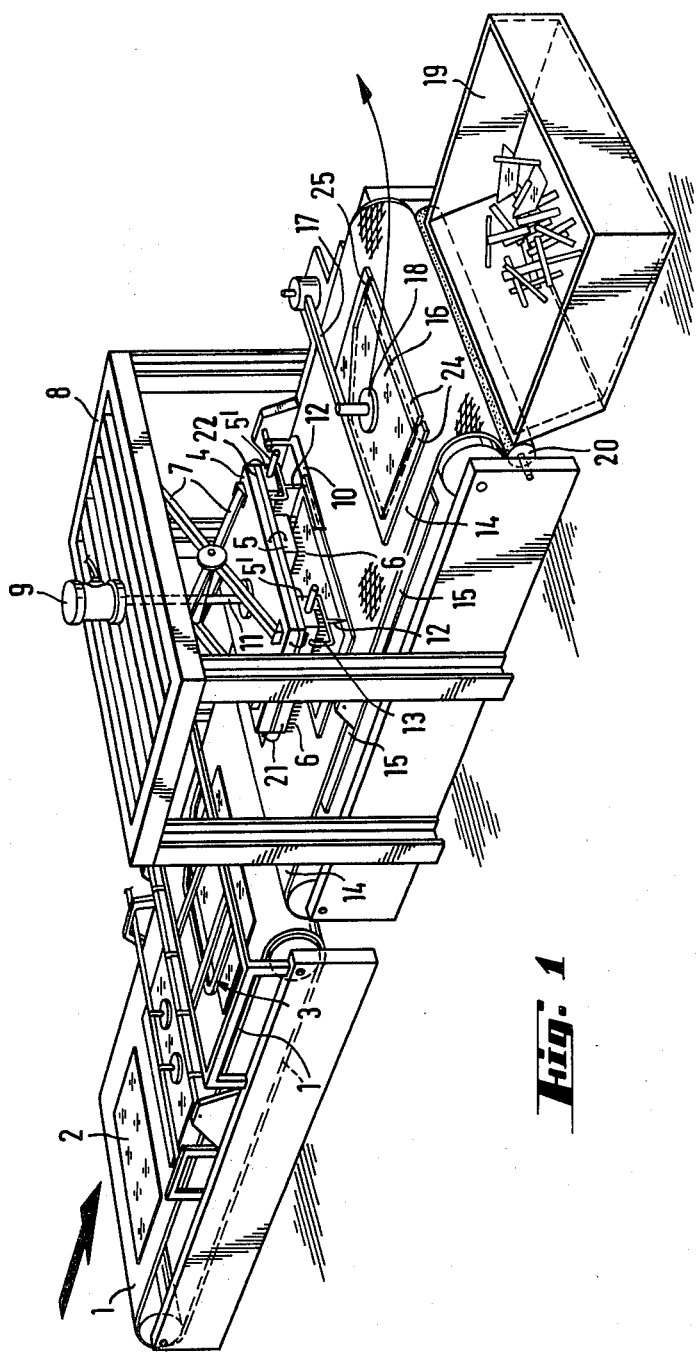
FIG. 1 is a perspective view of the apparatus for breaking off the marginal strip laterally outward of a scored line on a glass blank.
Figure 2:
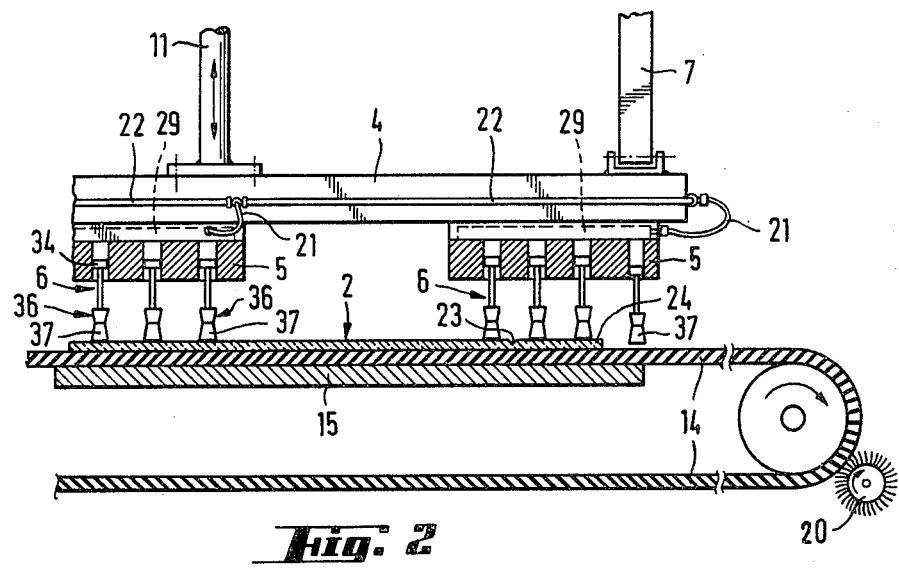
FIG. 2 is a side elevational view of a portion of the apparatus of FIG. 1.

The apparatus of the present invention, as perhaps best seen in FIG. 1, has a specific industrial applicability in breaking off the marginal edge, that is, the previously mentioned "marginal strip", laterally outward of a scored line in an industrial process including the conveying of a glass blank, the application of the score line to the glass blank to define the contour of a glass pane for use, which typically may be in connection with automobiles, the breaking off of the marginal edge outward of the score and the conveyance of the glass pane to a location for pick-up and transport to any further working station.

The operative components of the apparatus are supported conventionally by a frame structure or a plurality of frame structures suitably disposed to permit the various operative steps of the process to be carried out after the glass blank 2 is located to the apparatus at the left (see FIG. 1) and during movement in the direction of the solid arrow toward a downstream location. The glass pane 16 which arrives at the downstream location in concert with a plurality of broken off components 24 comprising the marginal edge may then be grasped for removal from the apparatus.

A conveyor including a belt 1 and a pair of rollers which are spaced apart to provide an extended run for the belt is supported by the frame structure. The rollers may be supported by individual axles, either keyed or otherwise secured thereby to undergo conjoint movement with the roller it supports. The axles, in turn, are supported at their ends in individual journals carried by the frame structure. One of the axles is driven (a drive means is not shown) whereby the belt moves along an endless path. The belt may be of any material as conventionally used in industry, and preferably one or both of the axles will have capability of adjustment to adjust the tension of the belt and ensure against slippage.

Figure 3:
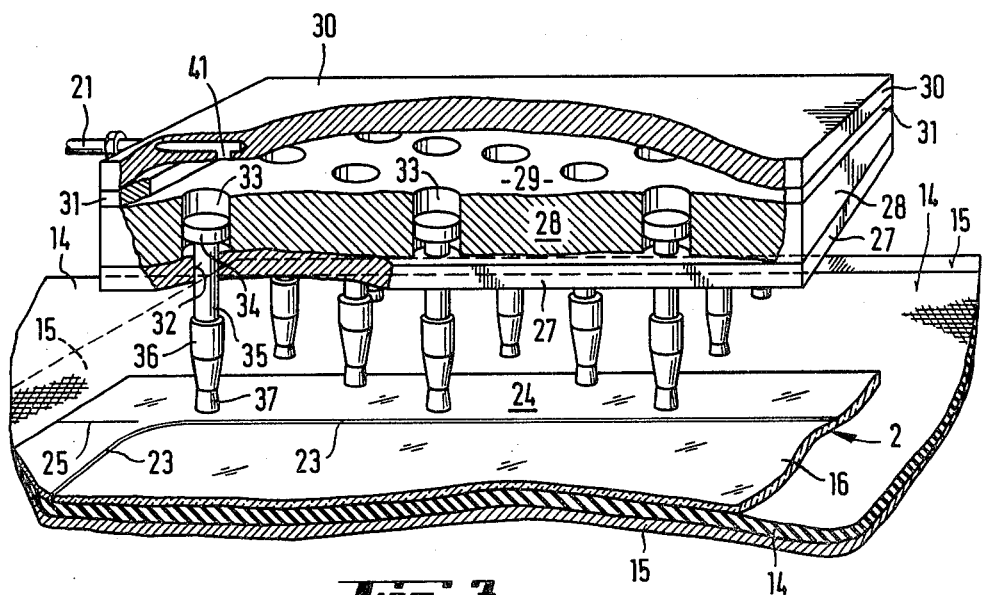
FIG. 3 is a perspective view of a pressure housing with pressure pins located above a support table and a conveyor, with the various parts broken away thereby to illustrate operative features of the apparatus.
Figure 4:
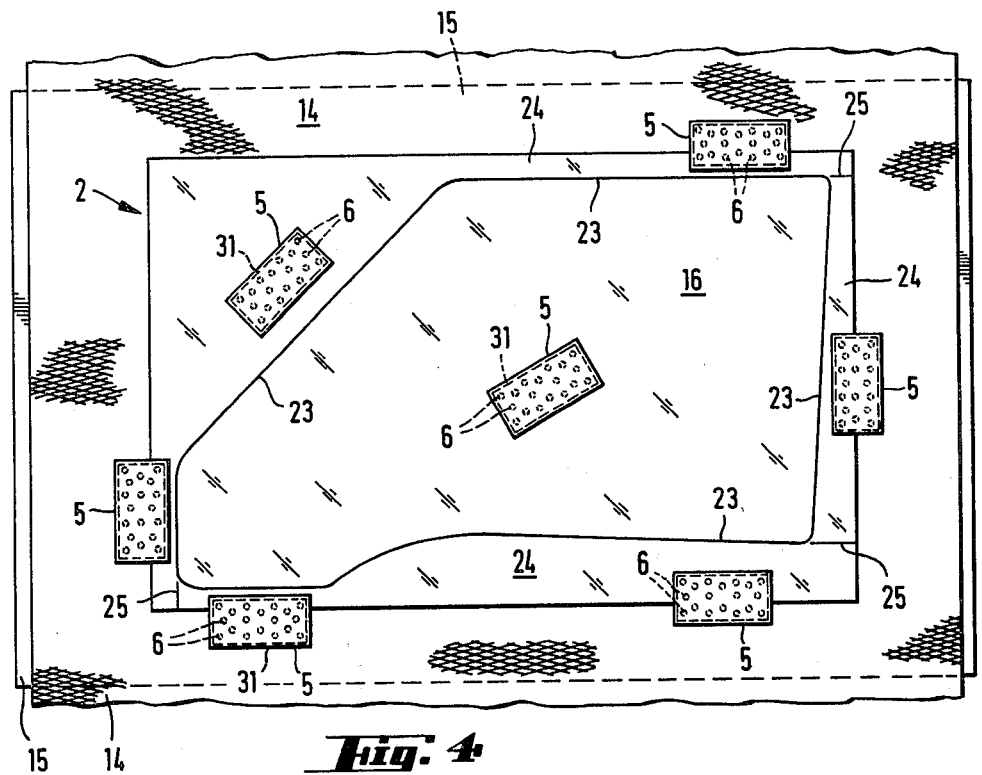
FIG. 4 is a plan view of a portion of the apparatus illustrating the arrangement of pressure housings for breaking off the marginal strip of a glass blank in positions relative to the glass blank upon which they act.

The apparatus of the present invention includes subassemblies both for creating a score line 23 on the glass blank 2, see for example FIGS. 3 and 4, which defines the outer contour of the glass pane 16 and provides a line about which the marginal edge will flex under tensile stresses; and for applying the aforementioned tensile stress in breaking off the marginal edge.

The scoring subassembly 3 may be seen generally in FIG. 1, in position along the run of conveyor belt 1, and may be considered conventional in operation and control. Typically, the subassembly includes one or more styli, structure for supporting each stylus and a control for movement of each stylus according to the contour of a model pane.

The subassembly for applying tensile stress to the glass blank 2 (hereafter "second subassembly") within the region of the score line 23 thereby to cause break off of the marginal edge comprises an important aspect of the invention. The second subassembly is located downstream of the scoring subassembly 3 and, as illustrated in FIG. 1, is supported by a second frame structure. Both frame structures include a pair of walls, spaced apart by a distance slightly greater than the width of conveyor belt 1 and a belt 14 of the conveyor forming a part of the second subassembly. Belt 14 similarly is supported by a pair of rollers which, in turn, are supported by individual axles journalled at their ends in the spaced walls for movement. Again, one of the axles is driven (drive means not shown), both axles are keyed or otherwise connected to the supported roller for conjoint rotation, and one or both of the axles is capable of adjustment to adjust the tension of belt 14.

A plate 15 is carried by the frame structure of the second subassembly. The plate is disposed below the upper run (referring to FIG. 1) of belt 14 to provide support for the belt across its entire width. And, the plate extends through a distance along the length of the run of belt 14 which at least equals the upstream to downstream dimension, or width, of a movable structure of the second subassembly. The size relationship of the plate and movable structure may be seen to advantage in FIG. 4, wherein the outer dimension, both length and width, of the movable structure generally includes the body of housings 5 within its boundary.

The movable structure, more particularly, includes a plate 4 and a plurality of housings 5. Each housing is supported by the plate 4, on the side facing belt 14 and a glass blank 2 which is conveyed to the region therebelow. The second frame structure further includes a fixed frame 8, and a guide rod system 7 is provided for mounting plate 4 to the fixed frame. As best seen in FIG. 1, the guide rod system generally includes two pairs of crossed legs and a member extending between the point of intersection of the legs of each pair. A cylinder 9 which may be hydraulic or operated by compressed air is carried by the fixed frame. A piston rod 11 is connected between the cylinder and the other surface of plate 4. The movable structure may be controlled in movement vertically between upper and lower limit positions by suitable pressurization of the cylinder. Thus, the cylinder may be pressurized for downward movement of the movable structure or vice versa, and suitable means, such as a spring or the application of pressure may be provided for return movement of the movable structure.

The upper runs of conveyor belts 1, 14 are arranged so that a glass blank 2 will move in the downstream direction from the first conveyor to the second conveyor to a position at which further movement is restrained by a stop. As may be seen in FIG. 1, the stop comprises an arm 10 which extends across belt 14 from the region of an ear carried by one wall toward the opposite wall of the second subassembly. The arm 10 is supported on a pin capable of pivotal movement about its axis thereby allow movement of the arm counterclockwise from the position of FIG. 1. The arm may be controlled by any means as may be suitable to function in a manner to restrain movement of the glass blank 2 prior to the operation of breaking off the marginal edge and, then, to permit the glass pane 16 and the broken off components 24 to move with the belt 14. The belt 14 may be stopped during the breaking off operation and then started, again, to deliver a following glass blank to the second subassembly.

The specific function of the arm 10 is that of positioning the glass blank prior to commencement of the breaking off operation more particularly described below. However, it is not absolutely necessary that a glass blank in the process of breaking off the marginal edge of a continuous run of glass blanks be positioned to a degree of criticality for slight shifts of a glass blank at the second subassembly are of no real consequence.

After the breaking off of the marginal edge, the glass pane 16 and the broken off components 24 move to a position further downstream. The glass pane, then, is removed from belt 14 as the broken off components 24 fall from the belt into a collection hopper, such as container 19. A cleaning roller 40 is disposed adjacent the downstream end of the second conveyor for purposes of wiping and freeing any splinters or other foreign material from belt 14. The cleaning roller may comprise a bristled surface and may be mounted in a manner similar to the mounting of the rollers of the conveyors to be parallel along its axis.

As previously indicated, the movable structure includes the plate 4 and a plurality of housings hereafter described as pressure housings 5 and 5'. Pressure housings 5 and 5' are similar and the prime denotes the pressure housings which are disposed at the corners of plate 4 (see FIG. 1).

In many operations, the provision of an auxiliary cut or cuts, such as cut 25 (see FIG. 3) within the marginal edge of the glass blank outwardly of score line 23 is unnecessary and this may quickly be determined as the process begins and the difficulty of the break, if any, is observed. However, oftentimes it is necessary to provide one or more cuts or scores within the marginal edge to facilitate the process of breaking off of the marginal edge. Thus, the different identification of the pressure housings in the Figures of drawing denote pressure housings which do not and which do carry a cutting tool, respectively. Alternatively, it is possible to provide one or more scores during the scoring operation carried out in a scoring subassembly.

The cutting tool 12 provides an auxiliary score 25 in a direction from the score 23 toward the outside edge of the glass blank as determined by the alignment of the pressure housing 5' relative to plate 4. Each score 25 will serve to subdivide the marginal edge of the glass blank and in situations in which one or more scores are required, the scores will facilitate the process of breaking off of the marginal edge from glass pane 16.

Cutting tool 12 is carried by a stirrup 13 (see FIG. 1) which is rotatable about the horizontal axis of a pressure housing 5'. The cutting tool is controlled in movement (by means not shown) toward and away from the glass blank 2 for scoring the marginal edge. The control means may be any structure conventional in the art. If the normal rest position of the cutting tool is above the surface of the glass blank, the cutting tool will not impede any operation to be described.

Turning to FIGS. 2, 3, 6 and 7, each pressure housing 5 (and 5') comprises a bottom plate 27, an intermediate plate 28 and a top plate 30. A frame or gasket 31 is located between the intermediate and top plates thereby to form a chamber 29 between the intermediate and top plates as well as to seal the chamber. The chamber may be pressurized for purposes hereafter set out. The lower and intermediate plates (see FIGS. 3 and 5) are provided with a plurality of bores 32 and the intermediate plate is counterbored throughout its entire thickness. The bore in intermediate plate 28 is denoted as "33".

A pressure pin 6 is received in each of the coaxial bores 32, 33 for guided movement in opposite longitudinal directions. Each pressure pin comprises a piston 34, piston rod 35 and head piece 36. Preferably, the head piece is capable of replaceable attachment to the piston rod, and the head piece is formed of a material having a characteristic of slight deformability. The head piece, accordingly, may be formed of plastic such as a hard polyvinylchloride or an equivalent. Each head piece includes a lower section 37 of a length which corresponds at least to the thickness of the glass blank 2. The lower section, also, is shaped as a frustum of a cone with the diameter decreasing toward the piston rod. With this configuration, if a pressure pin engaged the glass blank in a region directly beside the score 23, the surface of the lower section would gradually move away from the score and the edge of the glass pane during the breaking off of the marginal strip with continued downward movement of the pressure pin. Thus, possible damage to the edge of the glass pane is obviated or substantially reduced.

In operation, a glass blank 2 is conveyed, following the formation of score 23 in accordance with a model contour, by belts 1, 14 to the position illustrated in FIG. 4, that is, to an operative position above plate 15 and under the movable structure. The glass blank is located in the operative position by the arm 10. The plate 15 provides a smooth solid surface and preferably comprises a planar metal member.

Plate 4 of the movable structure and the pressure housings 5 are constructed in a manner so that the housings may be arranged on the plate in a multiplicity of positions as determined by the particular contour of the glass pane from which the marginal strip is broken. The end to be achieved by the capability of relocation of the pressure housings relative to plate 4 is to provide that as many as possible of the pressure pins will be outside of score 23 within the region of the marginal edge. In FIG. 4, it is illustrated that one pressure housing 5 is located totally within the score 23, and all of the remaining pressure housings and their pressure pins are located outside of the score. In the embodiment disclosed, and this is preferred, the plate 4 is an electromagnetic plate, while the top plate 30 of each pressure housing is formed of some ferromagnetic material.

Each chamber 29 of pressure housings 5 is connected to a source of pressure. To this end, a bore 41 may be formed in the top plate 30, in communication with chamber 29, and a pressure line 21 may be connected to the bore. Each line 21, in turn and by suitable connectors, is connected to line 20 and either a source of compressed air or a pneumatic source (not shown).

Figure 5:
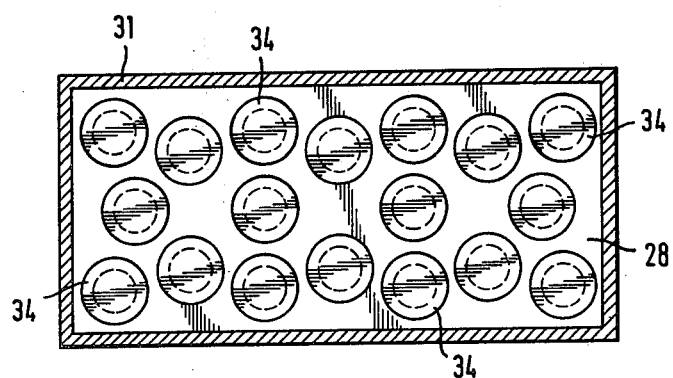
FIG. 5 is a horizontal section through one of the pressure housings as seen looking toward the support table.

Referring to FIG. 5, there is illustrated an arrangement of pressure pins 6 for carrying out the invention. The number of pressure pins may vary from five (5) to twenty (20) pressure pins per dm². Each pressure pin is mounted individually, for independent operation, and for movement in a vertical direction. FIG. 5 illustrates a particularly preferred arrangement of pressure pins whereby a plurality of pressure pins will be disposed generally in a direction transverse to the score 23 for different orientations of the housings, as discussed. The diameter of the piston 34 may be in the range of from 10 to 20 mm and the pressure pins may be located on centers of from 15 to 25 mm. Preferably, however, the diameter of each piston is 16 mm and the housings 5 will be of a dimension of from 100 to 150 mm in length and of from 50 to 80 mm in width to accommodate the several pressure pins.

The chamber 29 is pressurized to subject the piston 34 of each pressure pin 6 to a pressure according to the thickness of the glass blank to be processed. For example, each pressure pin may be subjected to a force of at least 2.5 kg if the process is carried out on a glass blank having a thickness of about 4.6 mm. If the thickness of the glass blank is about 8 mm, a force of at least 10.5 kg is required. Each piston includes an annular cutout (not shown) and an O-ring or the equivalent (also not shown) is located to the cutout for purposes of sealing the cylinder.

Figure 6:
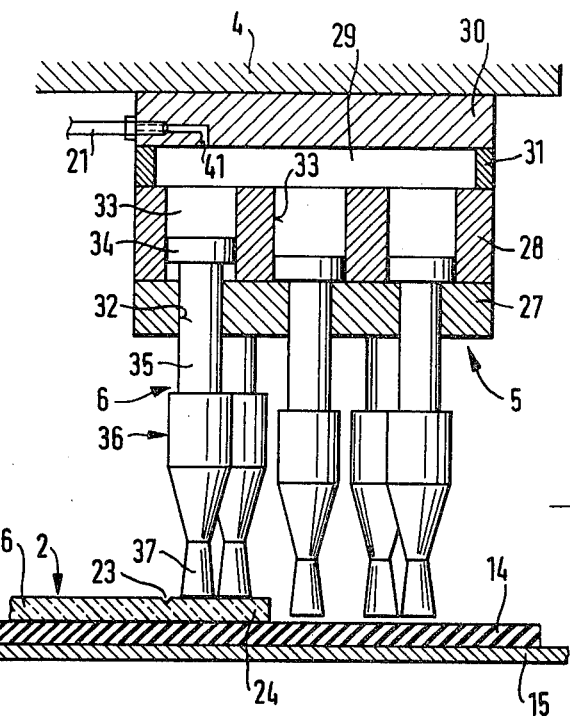
FIG. 6 is a view in elevation of the right end of the structure illustrated in FIG. 3, partially in section, with the pressure pins in a disposition prior to actual breaking of the marginal strip; and, FIG. 7 is a view similar to FIG. 6 illustrating the pressure pins in a disposition during actual breaking of the marginal strip.
Figure 7:
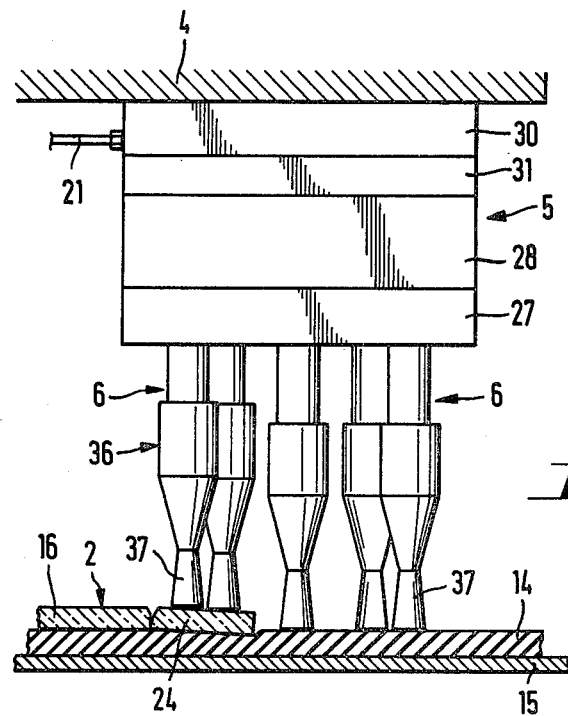

FIGS. 6 and 7 illustrate the position of the movable structure and the pressure pins 6 prior to and during the process. Prior to the process, the pressure pins are pressurized to the same position within the bores 32.

It is also contemplated that the pressure pins may be controlled mechanically, as by spring loading in carrying out the process.

FIG. 7 illustrates a movement of the movable structure from the FIG. 6 position after the lower end 37 of each pressure pin 6 has reached the surface or the plane of the surface of glass blank 2. In further lowering of the movable structure, the marginal edge 24 of the glass blank will be subject to bending tension in the area of and along the score 23.

The belt 14 comprises an important aspect of the present invention. To this end, the belt allows the bending tension and serves to facilitate the breaking off of the marginal edge.

The belt is flat and preferably should be capable of providing a characteristic of tear and cut resistance to damage by glass slivers or edges of larger pieces, it must be capable of displaying an elastic deformability and a yieldability below the glass blank when pressure is being applied by the pressure pins and it must be capable of use as the means for conveying the glass blank. The belt may be formed of rubber, or some other elastomeric material, and it may be formed of plastic, either with or without an insert fabric. One particularly successful belt is a belt having a thickness of about 5 mm and formed of plastic with polyester fabric inserts. A belt of this type is produced by the firm of Ernest Siegling, Hannover, West Germany, and sold under the designation E8/2UO V20 ARH.

While the apparatus as has been discussed heretofore includes a generally straight conveying path, it should be obvious that glass blanks may be acted upon at the several subassemblies during movement, also, in a circular conveying path.

The pressure and the bending tension advantageously should be applied by the pressure pins in at least four (4) housings. When the process is carried out on small glass blanks, it is preferred to locate at least one (1) housing within the area of score 23. When the process is carried out on large glass blanks all housings may be located so that the greatest number of pressure pins act in the area of the marginal edge.

As may be seen in FIG. 7, the marginal edge is being pressed into the elastically resilient belt 14 supported by the plate 15. While it is important that the material of the belt provide the aforementioned resiliency, the material should not be so soft as to permit deep deformation of the surface by the marginal edge under the force supplied by the pressure pins.

Once the glass pane whose marginal edge is removed reaches the downstream location it is removed from belt 14. To this end, the apparatus includes a suction plate 18 carried by an arm 17. The arm may be lowered so that the suction plate "grasps" the glass pane and, then, may be moved through an arcuate path, indicated by the arrow.

As will be apparent, the apparatus successfully functions in the manner intended and overcomes the problems and disadvantages of the prior art.

We claim:

1. Process for breaking off the marginal edge of a glass blank outside of a score of a predetermined outline while the glass blank resides on a level, elastically resilient support and as the surface at least in the area outside of the score is placed in a condition of bending stress by a lowerable tool characterized in that singly and resiliently mounted pressure pins are lowered onto the surface of the glass at a slight distance from one another in such a way that a higher surface pressure is applied to the lateral strip outside of the score by a greater number of pressure pins than is applied to the glass pane inside of the score, which application of pressure at the same time deforms the elastically resilient support through a bending of the lateral strip outside of the score more strongly than inside of the score to thus place the surface provided with the score under a tensile stress causing the lateral strip to break along the score.

2. The process of claim 1, characterized in that the pressure exerted by the pressure pins is adjusted in accordance with the thickness of the glass blank.

3. The process of claim 2, characterized in that each pressure pin is subject to a force of from 2.5 to 10.5 kg.

4. The process of any one of claims 1 to 3, characterized in that the pressure exerted by the pressure pins develops from a pneumatic pressure source.

5. The process of any one of claims 1 to 3, characterized in that the pressure exerted by the pressure pins develops from a mechanically charged source.

6. Apparatus for breaking off the marginal edge of a glass blank outside of a score of predetermined outline in a surface including a transport base formed of an elastically resilient material providing a support for said glass blank, a plate having a substantially planar surface for supporting said transport base, said plate being of a size at least coextensive with that of said glass blank, and pressure means movable into surface contact with said glass blank within said score of predetermined outline and within the region of said marginal edge, said pressure means exerting a pressure within said region of said marginal edge greater than the pressure exerted on said glass blank within said score of predetermined outline to deform said transport base through a bending movement of said marginal edge along said score as said surface including said score substantially simultaneously is placed under a condition of tensile stress whereby said marginal edge breaks away from said glass blank at said score.

7. The apparatus of claim 6 wherein said pressure means comprises a pressure tool, a movable plate supporting said pressure tool, and a plurality of pressure pins supported by said pressure tool, each pressure pin mounted individually and resiliently for movement independently of one another, and said pressure pins being provided in an amount of from five (5) to twenty (20) per dm$^2$.

8. The apparatus of claim 7, characterized in that each pressure pin is loaded under a force of from 2.5 to 10.5 kg.

9. The apparatus of claim 7 or 8, characterized in that the pressure developed within pins are moved by pressure a pressure source.

10. The apparatus of claim 7 or 8, further including a housing supported by the movable plate and characterized in that the pressure pins are combined into groups and that each group of pressure pins is disposed in the housing.

11. The apparatus of claim 10, characterized in that the housing includes a head plate formed of ferromagnetic material and the movable plate is an electromagnet thereby to movably locate the structure by a magnetic force.

12. The apparatus of claim 11, further including means for providing an auxiliary cut along said marginal edge, said cutting means carried by one of said housings.

13. The apparatus of claim 10, further including means for providing an auxiliary cut on the lateral strip, said cutting means carried by one of the housings.

14. The apparatus of claim 7, characterized in that the pressure tool comprises a plurality of housings carrying pressure pins, said housings carried by a plate and located in dependence on the model of the glass pane that is to be broken off whereby at least four housings become active along the lateral strip.

15. The apparatus of claim 14 characterized in that the pressure load on a relatively small glass blank is exerted by a group of pressure pins disposed inside of the score in the middle area of the glass pane with a plurality of groupings of pressure pins disposed outside of the score in the lateral strip.

16. The apparatus of claim 7, characterized in that each pressure pin has a lower end with an upward and inward tapering shape.

* * * * *

UNITED STATES PATENT AND TRADEMARK OFFICE
CERTIFICATE OF CORRECTION

PATENT NO. : 4,371,103

DATED : February 1, 1983

INVENTOR(S) :

It is certified that error appears in the above-identified patent and that said Letters Patent are hereby corrected as shown below:

Column 9, lines 16, 17 and 18 (Claim 9) should read as follows:

--9. The apparatus of claim 7 or 8, characterized in that the pressure pins are moved by pressure developed within a pressure source.--

Signed and Sealed this

Twenty-fourth Day of May 1983

[SEAL]

Attest:

DONALD J. QUIGG

Attesting Officer     Acting Commissioner of Patents and Trademarks